(12) United States Patent  
Shih

(10) Patent No.: US 9,170,717 B2  
(45) Date of Patent: Oct. 27, 2015

(54) GRAPHICALLY MANAGING INTERACTIVE ANALYTIC DATA

(71) Applicant: Jenngang Shih, Santa Clara, CA (US)

(72) Inventor: Jenngang Shih, Santa Clara, CA (US)

(73) Assignee: SAP SE, Walldorf (DE)

( * ) Notice: Subject to any disclaimer, the term of this patent is extended or adjusted under 35 U.S.C. 154(b) by 251 days.

(21) Appl. No.: 13/918,659

(22) Filed: Jun. 14, 2013

(65) Prior Publication Data

US 2014/0372924 A1    Dec. 18, 2014

(51) Int. Cl.
   *G06F 3/048*    (2013.01)
   *G06F 3/0484*   (2013.01)

(52) U.S. Cl.
   CPC .................................... *G06F 3/0484* (2013.01)

(58) Field of Classification Search
   CPC ....................................................... G06F 3/0486
   USPC ......................................................... 715/769
   See application file for complete search history.

(56) References Cited

U.S. PATENT DOCUMENTS

| | | | |
|---|---|---|---|
| 6,539,347 B1 * | 3/2003 | Paterson et al. | 703/22 |
| 2006/0282353 A1 * | 12/2006 | Gikandi | 705/30 |
| 2008/0195452 A1 * | 8/2008 | Ponce de Leon | 705/8 |
| 2010/0095235 A1 * | 4/2010 | Bennett et al. | 715/781 |
| 2011/0040537 A1 | 2/2011 | Shih | |
| 2011/0072392 A1 | 3/2011 | Shih | |
| 2012/0144335 A1 * | 6/2012 | Abeln et al. | 715/771 |
| 2012/0179512 A1 * | 7/2012 | O'Keeffe | 705/7.37 |
| 2014/0163944 A1 * | 6/2014 | Jiang | 703/13 |

\* cited by examiner

*Primary Examiner* — Omar Abdul-Ali

(74) *Attorney, Agent, or Firm* — Fish & Richardson P.C.

(57) ABSTRACT

Techniques for graphically managing interactive analytic data include presenting a virtual workspace to a user that includes a visual representation of a simulation analysis that includes a plurality of graphical analytic data modules, each graphical analytic data module including a plurality of variables that define a business process; identifying a change to a particular variable of a particular graphical analytic data module, the change defined by a user interface (UI) adjustment of a dimension of the particular graphical analytic data module that represents the particular variable; based on the identified change to the particular variable of the particular graphical analytic data module, adjusting at least one business process output of the simulation analysis; and presenting a revised virtual workspace to the user, the revised virtual workspace including the particular graphical analytic data module and at least one business process output of the simulation analysis.

15 Claims, 9 Drawing Sheets

GRAPHICALLY MANAGING INTERACTIVE ANALYTIC DATA

TECHNICAL BACKGROUND

This disclosure relates to graphically managing interactive analytic data and, more particularly, graphically managing interactive analytic data in a "what if," or sensitivity analysis.

BACKGROUND

"What-if," or sensitivity, analysis is a useful task for performing business analysis for coming up with alternatives that optimize business decisions. For example, finding the best combination of gross revenue and cost of goods sold for optimizing the gross profit is a common business problem that can be addressed with what-if analysis. Generally, what-if analysis often uses a table to represent input variables, output variables, and formulae for expressing the relationship between the variables. Each time an input variable changes, the output will change accordingly based on the calculation of the formula. Each of these results is known as a scenario. For example, worst case and best case are two separate scenarios, while current case is a special case of the scenarios representing the original value. By individually entering various values in the input variables, a user may attempt to find a combination that maximizes a particular output.

SUMMARY

The present disclosure relates to computer-implemented methods, computer-readable media, and computer systems for graphically managing interactive analytic data. One computer-implemented method includes presenting a virtual workspace to a user, the virtual workspace including a visual representation of a simulation analysis that includes a plurality of graphical analytic data modules, each graphical analytic data module including a plurality of variables that define a business process; identifying a change, initiated by the user, to a particular variable of a particular graphical analytic data module of the plurality of graphical analytic data modules, the change defined by a user interface (UI) adjustment of a dimension of the particular graphical analytic data module that represents the particular variable; based on the identified change to the particular variable of the particular graphical analytic data module, adjusting at least one business process output of the simulation analysis; and presenting a revised virtual workspace to the user, the revised virtual workspace including the particular graphical analytic data module and at least one business process output of the simulation analysis.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In a first aspect combinable with any of the implementation, the change includes a first change, the particular variable includes a first particular variable, the dimension includes a first dimension, and the UI adjustment includes a first UI adjustment.

A second aspect combinable with any of the previous aspects further includes identifying a second change, initiated by the user, to a second particular variable of the particular graphical analytic data module.

In a third aspect combinable with any of the previous aspects, the second change defined by a second UI adjustment of a second dimension of the particular graphical analytic data module that represents the second particular variable.

In a fourth aspect combinable with any of the previous aspects, the first and second UI adjustments occur substantially simultaneously.

In a fifth aspect combinable with any of the previous aspects, the simulation analysis includes a what-if analysis, and the business process includes an opportunity pipeline simulation.

In a sixth aspect combinable with any of the previous aspects, the graphical analytic data module includes a bubble that defines a business opportunity, the particular variable includes a success percentage of the business opportunity, and another of the plurality of variables includes an end date of the opportunity, and the UI adjustment of the dimension of the particular graphical analytic data module that represents the particular variable includes a change to a circumference of the bubble.

A seventh aspect combinable with any of the previous aspects further includes identifying another change, initiated by the user, to another particular variable of the particular graphical analytic data module, the other change defined by another UI adjustment of another dimension of the particular graphical analytic data module that represents the particular variable, the other UI adjustment including a change to one or more coordinates of the particular graphical analytic data module in the virtual workspace.

In an eighth aspect combinable with any of the previous aspects, the UI adjustment includes at least one of a drag and release action, a drag and drop action, or a resize action.

Various implementations of techniques for graphically managing interactive analytic data as described in the present disclosure may include none, one, some, or all of the following features. For example, such techniques may simplify what-if analysis by providing a user one or more techniques to explicitly interact with graphical elements rather than indirectly interact with such elements through raw data (e.g., input data). As another example, such techniques may facilitate adjustment of raw data (e.g., input data) through adjustment of a graphical representation of such data such as, for instance, adjustment of geometrical location, size, or other graphical attribute. Further, such techniques may enable a user to vary multiple what-if analysis variable values simultaneously. As another example, such techniques may facilitate instant (e.g., real time or near real time) update of what-if analysis results as a result of varying variable values. As a result of such updates, and with the help of a GUI component, such as Progress Indicator, the progress of the simulation analysis can be visualized or monitored in real time. On the other hand, the value of an output variable, such as a "goal," can be set either by text entry or by graphical component in reverse order to trigger a change in the values of input variables, according to the formula definition involving the input and output (goal) variable.

The details of one or more implementations of the subject matter of this specification are set forth in the accompanying drawings and the description below. Other features, aspects,

DETAILED DESCRIPTION

Figure 1:
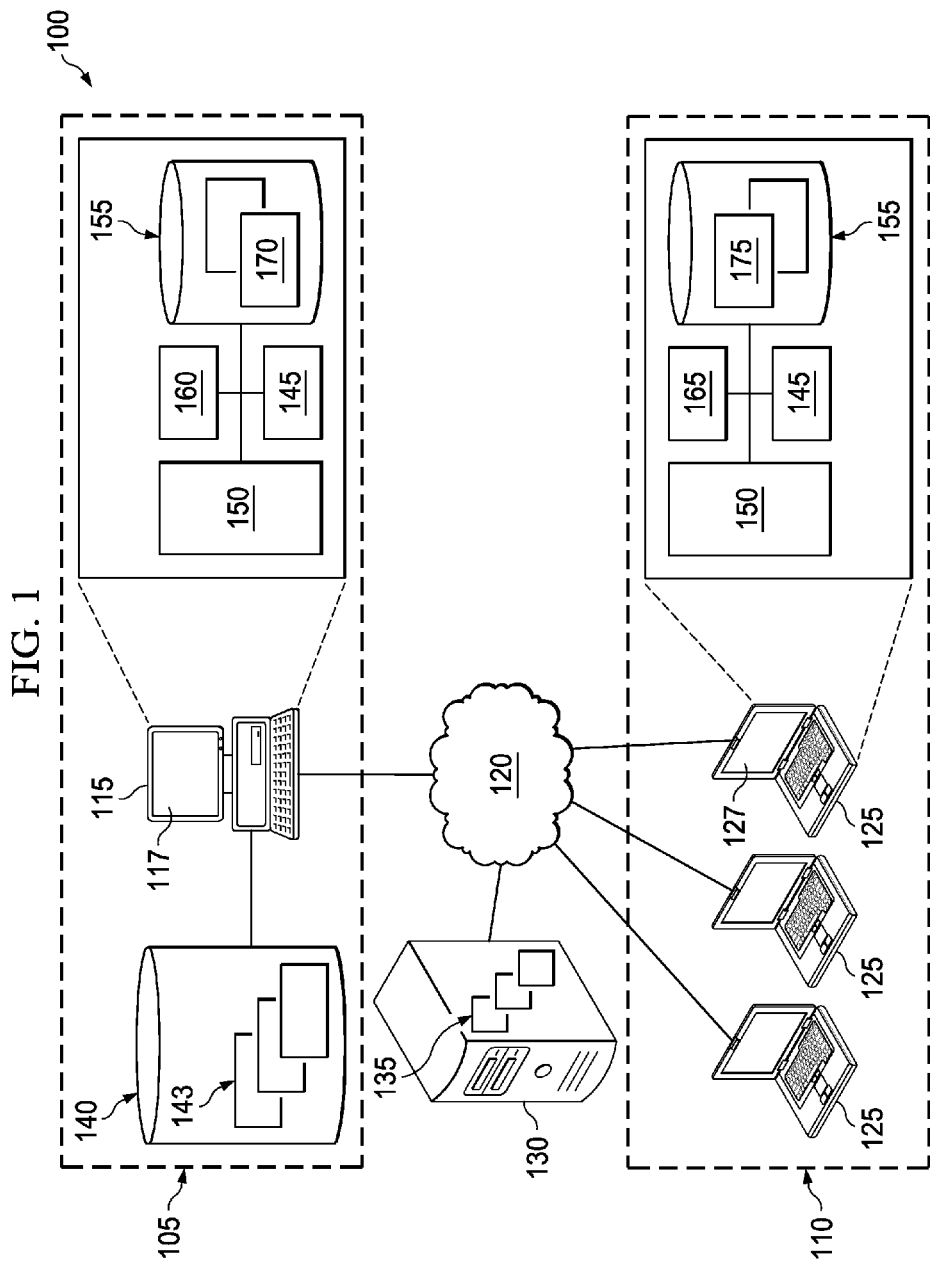
FIG. 1 illustrates an example distributed computing system for graphically managing interactive analytic data.

FIG. 1 illustrates an example distributed computing environment 100 for graphically managing interactive analytic data. Generally, computing environment 100 may facilitate techniques for graphically managing interactive analytic data. In some implementations, a virtual workspace or graphical representation (e.g., bar graph, line graph, bubble graph, or otherwise) of a simulation analysis (e.g., a what-if analysis or sensitivity analysis) can be presented to a user for viewing or adjustment. The graphical representation may include several graphical modules (e.g., bars, bubbles, or otherwise) that represent particular input (or independent) variables of the analysis. The user may graphically adjust such variables, such as by drag and drop, drag to move, resize, or other user interface (UI) techniques, in which case particular output (or dependent) variables and graphical modules that depend on, or are calculated by, the adjusted variables may be recalculated and/or adjusted. A revised or adjusted graphical representation that shows the recalculated and/or adjusted variables and graphical modules may be presented to the user.

The illustrated computing environment 100 includes a server system 105, a client system 110, and a remote computing system 130 communicably coupled through a network 120. Although illustrated as single systems, each of the systems 105, 110, and 130 may include more than one system and/or more than one computing device (e.g., computer, laptop, server, mobile device, and otherwise) within a distributed computing environment. In general, computing environment 100 depicts an example configuration of a system capable of providing stateful execution of stateless applications in a substantially transparent way, as well as dynamically determining the particular application's mode of operation in response to requests from its clients (e.g., client appliances 125).

The illustrated server system 105 includes one or more server appliances 115 having corresponding graphical user interfaces (GUIs) 117. In general, the server appliance 115 is a server that stores one or more applications, where at least a portion of the applications are executed via requests and responses sent to users or clients within and communicably coupled to the illustrated environment 100 of FIG. 1. In some instances, the server appliance 115 may store a plurality of various hosted applications, while in other instances, the server appliance 115 may be a dedicated server meant to store and execute only a single hosted application (e.g., the contextual workspace (server) 160). In some instances, the server appliance 115 may comprise a web server, where the applications, such as the contextual workspace (server) 160 represent one or more web-based applications accessed and executed via network 120 by the client appliances 125 of the environment 100 to perform the programmed tasks or operations of the hosted applications.

At a high level, the server appliance 115 comprises an electronic computing device operable to receive, transmit, process, store, or manage data and information associated with the environment 100. Specifically, the server appliance 115 illustrated in FIG. 1 is responsible for receiving application requests from one or more applications (e.g., associated with the clients 125 of environment 100 and responding to the received requests by processing said requests in the associated hosted application and sending the appropriate response from the hosted application back to the requesting client application 144. In addition to requests from the external clients 125 illustrated in FIG. 1, requests associated with the hosted applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server appliance 115, environment 100 can be implemented using two or more server appliances 115, as well as computers other than servers, including a server pool. Indeed, server appliance 115 may be any computer or processing device such as, for example, a blade server, general-purpose personal computer (PC), Macintosh, workstation, UNIX-based workstation, or any other suitable device (e.g., smartphones, PDAs, tablets). In other words, the present disclosure contemplates computers other than general purpose computers, as well as computers without conventional operating systems. Further, illustrated server appliance 115 may be adapted to execute any operating system, including Linux, UNIX, Windows, Mac OS, or any other suitable operating system.

The illustrated server appliance 115 is communicably coupled with a database 140, such as, in some examples, an in-memory database in the server system 105. In some embodiments, server 115 and/or certain of its components may be integrated with database 140 so that, for instance, processing (e.g., all or partial) may be performed directly on in-memory data with processing results passed (e.g., via a communication channel) directly to a client. In alternative embodiments, the in-memory database 140 may be located external to the server system 105 and communicably coupled to one or more of the server system 105 and/or client system 110 through the network 120. The illustrated in-memory database 140 may include integrated processing, i.e., all business and/or analytic operations done in processing memory. Moreover, content from business content sources may be replicated from one or more transactional systems (e.g., coupled to the network 120) to the in-memory database 140 immediately. Thus, the in-memory database 140, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some embodiments, the in-memory database 140 may expose business data and capabilities to improve an endsolution for end users (e.g., the client appliances 125). The in-memory database 140 may reside on top of a computational engine (e.g., in the server appliance 115 or otherwise) that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

The illustrated in-memory database 140 stores one or more data objects 143. The data objects 143 may include and/or reference a variety of objects that store and/or include business data. In some examples, the data objects 143 may be data cubes, such as OLAP (online analytical processing) cubes. The data cubes may consist of a data structure that allows for columnar data storage rather than, e.g., row data storage; different types of indices compared to relational databases; and in-memory technology as compared to data stored in relational databases. The data cube may also allow manipulation and/or analysis of the data stored in the cube from multiple perspectives, e.g., by dimensions, measures, and/or elements of the cube. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the simulation analysis modules). In some instances, the data cube may have three-dimensions, but any number of dimensions may be designed into the cube (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube. For instance, the data cube may be pivoted, in various ways. Each pivot provides the business user with a distinct view of particular business data stored in the cube. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube in real-time may allow the business user to more efficiently analyze the business data.

Other functions performable on data cubes may be, for instance, slice, dice, drill down/up, and roll-up. A slice operation identifies a subset of a multi-dimensional array corresponding to a single value for one or more members of the cube dimensions not in the subset. A dice operation is a slice operation on more than two dimensions of a data cube (or more than two consecutive slices). A drill down/up operation allows the business user to navigate the data cube's levels of data to reveal levels containing the most summarized (up) data to the most detailed (down) data. A roll-up operation involves computing all of the data relationships for one or more dimensions of the data cube.

The data objects 143 may include and/or store other forms of data along with or in place of data cubes. For example, the data objects 143 may represent, store, and/or reference data from one or more content sources, such as web content, feeds, REST services, business data repositories, reports, status updates, discussions, wikis, blogs, and other content sources. Of course, while illustrated as contained in the in-memory database 140, the data objects 143 may also be stored, for example, in one or both of the memories 155, in the remote computing system 130, and/or a separate repository communicably coupled to the network 120. In some embodiments, the data objects 143 may be stored in a raw, compiled, or compressed form or combination thereof.

The illustrated client system 110 includes one or more client appliances 125 having corresponding GUIs 127. Each client appliance 125 may be any computing device operable to connect to or communicate with at least the server system 105 and/or via the network 120 using a wireline or wireless connection. Further, as illustrated, each client appliance 125 includes a processor 150, an interface 145, and a memory 155. In general, each client appliance 125 comprises an electronic computer device operable to receive, transmit, process, and store any appropriate data associated with the environment 100 of FIG. 1. It will be understood that there may be any number of client appliances 125 associated with, or external to, environment 100. For example, while illustrated environment 100 illustrates three client appliances, alternative implementations of environment 100 may include a single client appliance 125 communicably coupled to the server system 105, or any other number suitable to the purposes of the environment 100.

Additionally, there may also be one or more additional client appliances 125 external to the illustrated portion of environment 100 that are capable of interacting with the environment 100 via the network 120. Further, the term "client" and "user" may be used interchangeably as appropriate without departing from the scope of this disclosure. Moreover, while each client appliance 125 is described in terms of being used by a single user, this disclosure contemplates that many users may use one computer, or that one user may use multiple computers. As used in this disclosure, client appliance 125 is intended to encompass a tablet computing device, personal computer, touch screen terminal, workstation, network computer, kiosk, wireless data port, smart phone, personal data assistant (PDA), one or more processors within these or other devices, or any other suitable processing device. For example, each client appliance 125 may comprise a computer that includes an input device, such as a keypad, touch screen, mouse, or other device that can accept user information, and an output device that conveys information associated with the operation of the server system 105 or the client appliance 125 itself, including digital data, visual information, any application, or the GUI 127. Both the input and output device may include fixed or removable storage media such as a magnetic storage media, CD-ROM, or other suitable media to both receive input from and provide output to users of the client appliances 125 through the display, namely, the GUI 127.

The illustrated network 120 facilitates wireless or wireline communications between the components of the environment 100 (i.e., between the server system 105 and the client system 110), as well as with any other local or remote computer (e.g., remote computing system 130), such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the client system 110 and the server system 105.

Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), cellular networks, all or a portion of the Internet, and/or any other communication system or systems at one or more locations.

The illustrated remote computing system 130 is communicably coupled to one or both of the server system 105 and client system 110 through the network 120. In some instances, as illustrated, the remote computing system 130 stores and/or references third party content 135, such as, for example, data objects, web content, electronic communications, content feeds, and other data sources. Although illustrated as a single appliance, the remote computing system 130 may include any number of appliances (e.g., servers, clients, mobile devices, and otherwise) coupled to the network 120 individually and/or in groups. For instance, in some embodiments, the remote computing system 130 may be a web content server delivering web content to one or more of the client appliances 125 in response to a request. In some embodiments, the remote computing system 130 may be a repository storing one or more data objects, such as data cubes or other form of database storing business data.

The illustrated communication interfaces 145 (shown as part of the server appliance 115 and the client appliance 125) facilitate communication among appliances in, for example, the client system 110, the remote computing system 130, and the server system 105. The interfaces 145 may also facilitate communication among the illustrated systems and other systems in a client-server or other distributed environment (including within environment 100) connected to the network. Generally, the interfaces 145 include logic encoded in software and/or hardware in a suitable combination and operable to communicate with the network 120. More specifically, the interfaces 145 may include software supporting one or more communication protocols associated with communications such that the network 120 or interface's hardware is operable to communicate physical signals within and outside of the illustrated environment 100.

The illustrated processors 150 (shown as part of the server appliance 115 and the client appliance 125) may be a central processing unit (CPU), a blade, an application specific integrated circuit (ASIC), a field-programmable gate array (FPGA), or another suitable component. Generally, the processors 150 execute instructions and manipulate data to perform the operations of the respective server appliance 115 and client appliance 125 and, specifically, the simulation analysis module (server) 160 and simulation analysis module (client) 165), as well as any other applications. Specifically, the server appliance's processor 150 executes the functionality required to receive and respond to requests from the client appliances 125 and their respective applications (e.g., contextual workspace (client) 165), as well as the functionality required to perform the other operations of the simulation analysis module (server) 160.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. Although illustrated as a single processor 150 for each of the respective server appliance 115 and client appliance 125 in FIG. 1, two or more processors may be used according to particular needs, desires, or particular embodiments of environment 100.

The illustrated memories 155 (shown as part of the server appliance 115 and the client appliance 125) may include any memory or database module and may take the form of volatile or non-volatile memory including, without limitation, magnetic media, optical media, random access memory (RAM), read-only memory (ROM), removable media, or any other suitable local or remote memory component. Each memory 155 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective server appliance 115 and client appliance 125. Additionally, each memory 155 may include any other appropriate data, such as VPN applications, firmware logs and policies, firewall policies, a security or access log, print or other reporting files, as well as others.

As illustrated, memory 155 of the server appliance 115 includes and/or stores one or more server content objects 170. Memory 155 of the client appliance 125 includes and/or stores one or more client content objects 175. In some embodiments, the server content objects 170 and/or the client content objects 175 may be similar to the data objects 143 stored in the in-memory database 140. For example, the content objects 170 and 175 may be data cubes, tables, reports, or other content sources, such as web content, electronic communications, feeds, and otherwise that are relevant to, for example, one or more what-if analyses. Regardless of the form of the content objects 170 and 175, these objects may contain and/or reference business data on which business logic may be applied in a what-if or sensitivity analysis.

The illustrated computing system 100 includes a simulation analysis module (server) 160 and a simulation analysis module (client) 165. At a high level, each of the simulation analysis module (server) 160 and a simulation analysis module (client) 165 (referred to collectively as the simulation analysis modules) is any application, program, module, process, or other software that may execute, change, delete, generate, or otherwise manage information according to the present disclosure, particularly in response to and in connection with one or more requests received from the illustrated client appliances 125 and their associated applications. In certain cases, only one simulation analysis module (server) 160 may be located at a particular server appliance 115. In others, a plurality of related and/or unrelated simulation analysis module (server) 160 may be stored at a single server appliance 115, or located across a plurality of other server appliances 115 in the server system 105, as well.

In certain cases, the simulation analysis modules may be implemented as composite applications. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the simulation analysis modules may represent web-based applications accessed and executed by remote client appliances 125 or client applications via the network 120 (e.g., through the Internet).

Further, while illustrated as internal to server appliance 115, one or more processes associated with the simulation analysis module (server) 160 may be stored, referenced, or executed remotely. For example, a portion of the simulation analysis module (server) 160 may be a web service associated with the application that is remotely called, while another portion of the simulation analysis module (server) 160 may be an interface object or agent bundled for processing at a remote client appliance 125 via the simulation analysis module (client) 165. Moreover, any or all of the simulation analysis modules may be a child or sub-module of another software module or enterprise application (not illustrated) without departing from the scope of this disclosure.

As explained more fully below, one or both of the simulation analysis modules 160 and 165 may present or facilitate presentation of a user interface, e.g., through GUI 117 and/or GUI 127, to a business user to perform a variety of tasks. For instance, the simulation analysis modules 160 and 165 may present one or more workspace modules containing business data relevant to the business user in a variety of forms, e.g., tables, graphs, notes, and otherwise for a simulation or what-if analysis. The relevant business data may be sourced from, for example, the data objects 143 or other content sources.

In some implementations, the simulation analysis modules may execute one or more what-if, or sensitivity, analysis techniques. For example, one example of a what-if analysis includes a profit-revenue analysis, in which gross revenue and cost of goods sold for optimizing the gross profit is analyzed. Input variables, output variables, and formula for expressing the relationship between the variables for a profit-revenue analysis include, respectively, Gross_Revenue and Cost_of_Goods_Sold as the input variables; Gross_Profit as the output variable; and, the formula of Gross_Profit=Gross_Revenue−Cost_of_Goods_Sold. Thus, each time an input variable changes, the output will change accordingly based on the calculation of the formula. Each of these results is known as a scenario. For example, Worst Case and Best Case are two separate scenarios; and, Current Values is a special case of the scenarios representing the original value. By entering various values in the input variables, a user may attempt to find a combination that maximizes the Gross_Profit, since an increase in revenue may incur at a disproportional higher cost, or decreased cost may dramatically reduce the revenue, both of which has a negative effect on the profit. In this example, therefore, the what-if analysis comprises a simulation of a maximum Gross_Profit and optimized distribution among the corresponding input variables.

In another example, the what-if analysis can include a spend management analysis. In this example, the input variables may include Supplier Invoice Amount, Discount, and Holding Cost (Global); and, the output variables may include Buy Now Amount and Buy Later Amount. The formula for defining the input/output relationships may be defined as: Buy Now Amount=Supplier Invoice Net Amount*(1−Discount/100)+Holding Cost and Buy Later Amount=Supplier Invoice Net Amount*(1−Inflation/100). User change to an input variable, such as Holding Cost affects an output variable. Each input change may result in a new scenario in terms of Buy Now Amount and Buy Later Amount.

In another example, the what-if analysis can include a pipeline simulation, which may narrow a deficit between values of a current pipeline and a target pipeline. A pipeline consists of a set of business opportunities. Each opportunity has a name and is represented by end date, deal size (e.g., in monetary terms), and chance of success. In this example, the inputs include End Date, Chance of Success and Deal Size, and the calculated result, or output, is Total Pipeline by End Date, which is calculated as follows: Total Pipeline[end_date] =sum (deal_size[i]*chance_of_success[i])[end_date], where i represents the ith opportunity in the pipeline.

Within the context of the present disclosure, the example system 100 can be used to perform the above-described example simulation analyses, as well as other examples. In some implementations, the system 100 may facilitate an interactive visual paradigm for a what-if analysis with an efficient and intuitive interface for the analysis tasks in terms of data-driven what-if analysis, and goal-driven what-if analysis as described more fully below.

Figure 2:
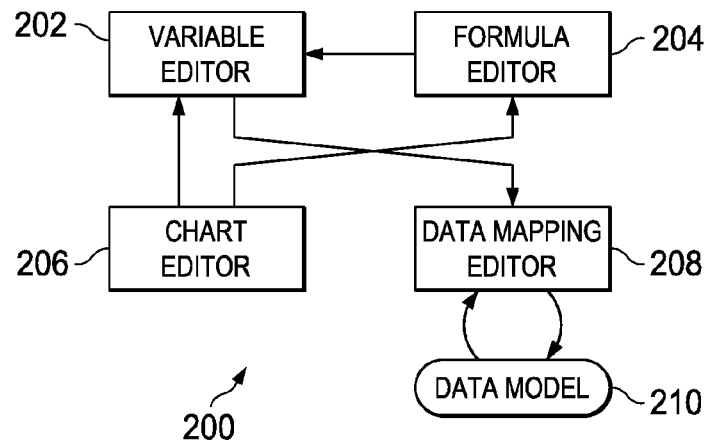
FIG. 2 illustrates an example design-time system architecture for graphically managing interactive analytic data.

FIG. 2 illustrates an example high-level design-time system architecture 200 for graphically managing interactive analytic data. In some implementations, architecture 200 may be implemented in all or part of the distributed computing system 100 shown in FIG. 1 and facilitate a simulation or what-if analysis according to the present disclosure. As illustrated, the architecture 200 includes a variable editor 202, a formula editor 204, a chart editor 206, and a data definition editor 208, each of which may be implemented in software, middleware, hardware, or a combination thereof. In some aspects, the variable editor 202 may provide an interface for a user to define variables that will be used in creating formula for defining a business problem. For example, the variable editor 202 may allow a user to input or provide the input variables of a simulation or what-if analysis such as the example input variables of the profit-revenue, spend management, and/or pipeline analyses above. The formula editor 204 may allow a user to model a business problem in terms of variables and mathematical operators, such as addition (+), subtraction (−), multiplication (*), division (/), modulation (%), or other operations. In some aspects, for example, the user may input a particular formula for a particular simulation analysis (such as those discussed in the above examples). The chart editor 206, in some aspects, allows a user to define, or automatically defines, a particular chart type that communicates one or more of the input variables and/or output results of a simulation or what-if analysis. For example, the chart editor 206 may define a chart type (e.g., bar, bubble, pie, or otherwise), a layout, number and/or type of axes, scales, and interactivities of the chart, as some examples. Finally, the data definition editor 208, in some aspects, may facilitate a mapping between variables and corresponding data elements in a data model, such as the illustrated data model 210.

In some aspects, as shown in the illustrated implementation, the variable editor 202 pulls attributes from the data mapping editor 208; the formula editor 204 pulls attributes from the variable editor 202; and the chart editor 206 pulls attributes from the variable editor 202 and formulae from the formula editor 204. Further, in the illustrated implementation, the data mapping editor 208 loads attributes from the data model 210 and stores editor definitions in the data model 210.

The data model 210, in some implementations, may be a database (e.g., a relational database) that includes or defines all or part of the data (e.g., inputs, formulas, outputs) used for graphically managing interactive analytic data. For instance, input data provided by a user through the variable editor 202 may be defined and/or stored in the data model 210. Further, variables and mathematical operators that define a formula provided by the user through the formula editor 204 may be stored and/or defined in the data model 210. Various characteristics of a chart as defined by the user through the chart editor 206 may be stored and/or defined in the data model 210.

Figure 3:
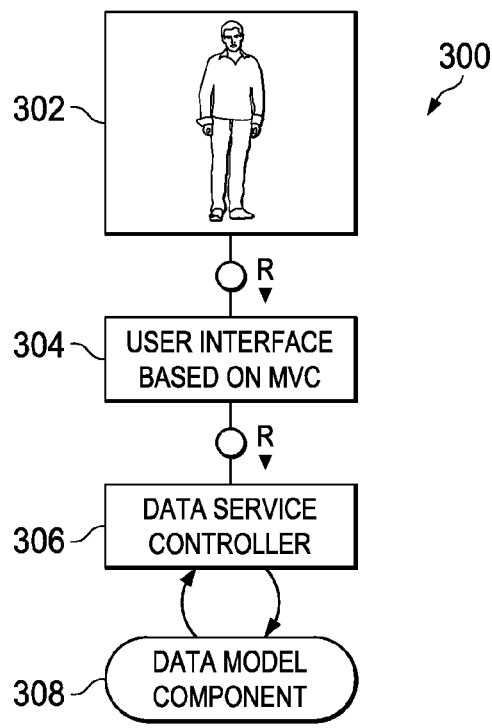
FIG. 3 illustrates an example run-time system architecture for graphically managing interactive analytic data.

FIG. 3 illustrates an example run-time system architecture 300 for graphically managing interactive analytic data. In some implementations, architecture 300 may be implemented in all or part of the distributed computing system 100 shown in FIG. 1 and with the corresponding design-time architecture 200 shown in FIG. 2, and facilitate a simulation or what-if analysis according to the present disclosure. As illustrated, the run-time architecture 300 includes a client 304, for example, a client based on the Model View Controller architecture pattern for handling user interactions from a user 302. The illustrated example architecture 300 also include a data service controller 305 that can handle, for instance, data service requests. The example architecture 300 also includes a data model component 308 for executing data retrieval and storage.

Figure 4:
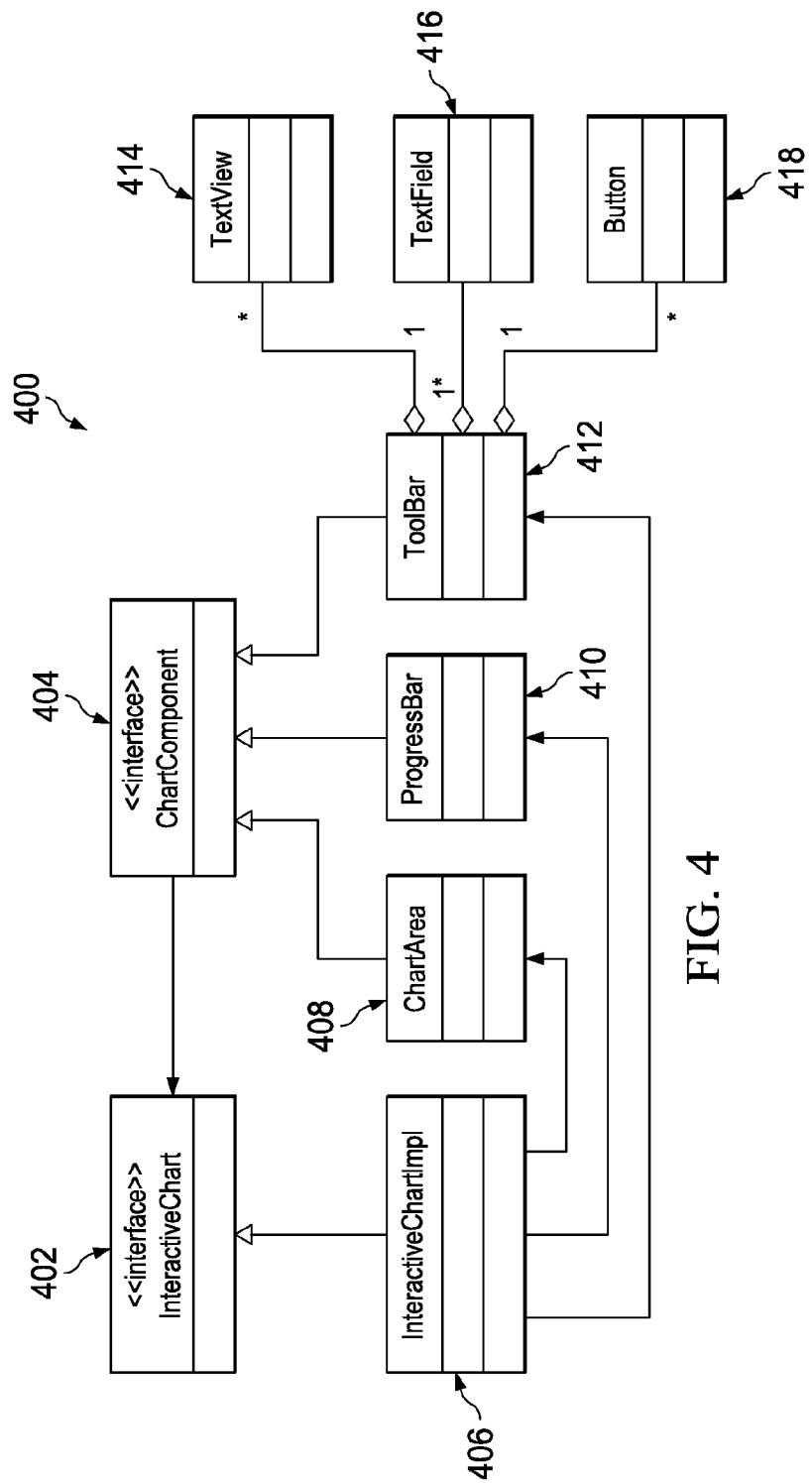
FIG. 4 illustrates a model of example component interactions within a system for graphically managing interactive analytic data.

FIG. 4 illustrates an example model 400 for component interactions within a system for graphically managing interactive analytic data. In some aspects, the example model 400 may describe interactions between one or more components of the architectures 200 and/or 300 shown in FIGS. 2 and 3 to facilitate a simulation or what-if analysis according to the present disclosure. The InteractiveChart interface 402, in this example, defines the communication with a chart component of a model that graphically manages interactive analytic data. The interface is implemented by InteractiveChartImpl class 406. The illustrated ChartComponent interface 404 defines the behaviors for various UI components, such as a ChartArea UI 408, a ProgressBar UI 410, and a ToolBar UI 412, each of which, for instance, are illustrated in the UI examples of FIGS. 6A-6E. Each UI component may consist of one or more sub-components. For example, the ToolBar UI 412 illustrated in FIG. 4 consists of a TextView UI 414, a TextField UI 416, and a Button UI 428 for displaying results, entering data and triggering actions, respectively.

Figure 5:
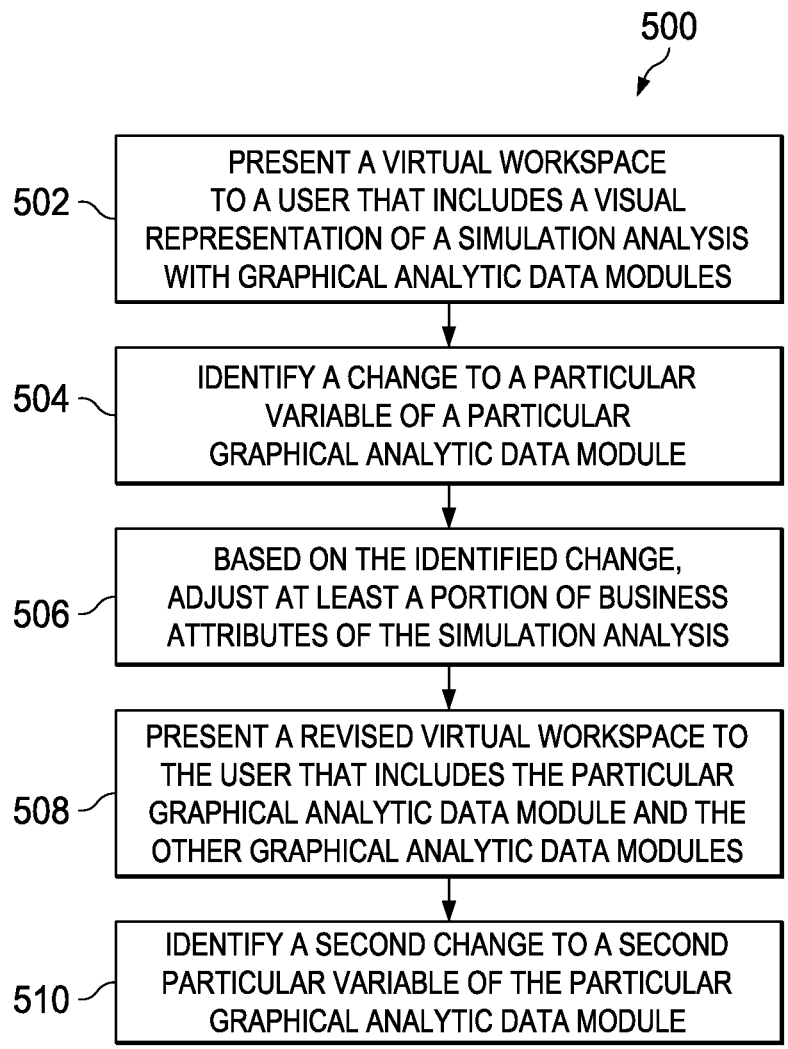
FIG. 5 illustrates an example method for graphically managing interactive analytic data.

FIG. 5 illustrates an example method 500 for graphically managing interactive analytic data. In some implementations, the method 500 may be executed with the example system 100 and the architectures 200 and 300 shown in FIGS. 1-3, respectively. However, in alternative implementations, the method 500 may be executed in other computing environments and/or with other architectures without departing from the scope of the present disclosure.

Figure 6A:
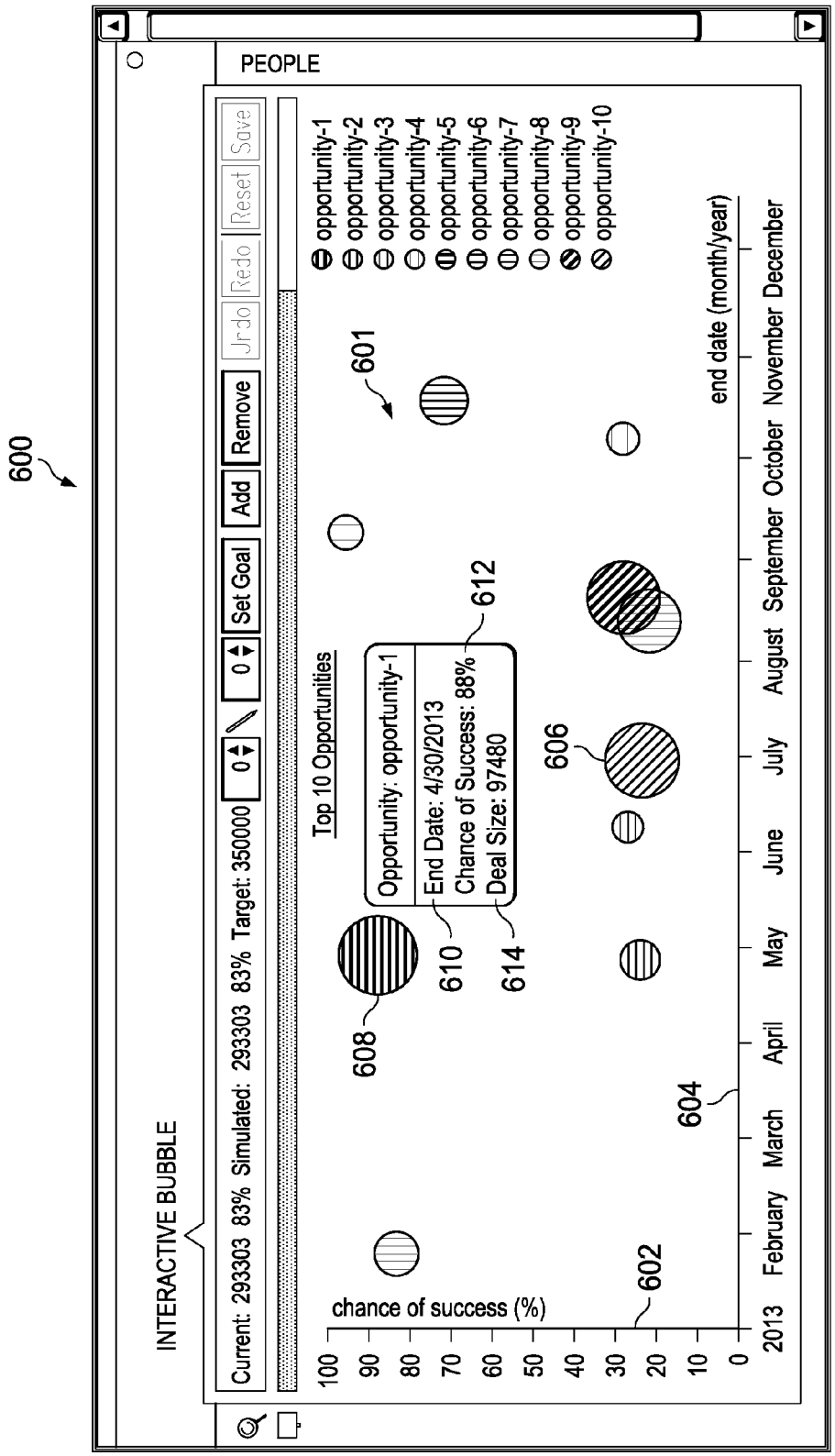
FIGS. 6A-6E illustrate example graphical user interfaces for a system for graphically managing interactive analytic data.

Method 500 may begin at step 502, when a virtual workspace that includes a visual representation of a simulation (e.g., what-if) analysis that includes graphical analytic data modules may be presented to a user. For example, as shown in FIG. 6A, a virtual workspace 600 is shown. The workspace 600 includes a bubble graph 601 as a visual representation of a simulation analysis. In this example, the simulation analysis is a pipeline simulation analysis as described above. As shown in FIG. 6A, the bubble graph 601 includes an y-axis 602 that describes a chance of success of an opportunity in the pipeline and an x-axis 604 that describes an end date of the opportunity in the pipeline. Multiple opportunities are represented in the graph 601 by "bubbles," or circles, that each have a particular dimension (e.g., circumference, diameter, or radius) and location on the graph 601. For example, opportunity 608 includes a deal size 614 that is defined by its relative size (e.g., circumference) and an end date 610 that is defined by its x-axis location on the graph 601. The opportunity 608 also includes a chance of success 612 that is defined by its y-axis location on the graph 601. In some aspects, one or more of the deal size 614, end date 610, and chance of success 612 may represent a particular adjustable variable (e.g., user adjusted) of the opportunity 608, which in turn may represent a particular graphical analytic data module.

Figure 6B:
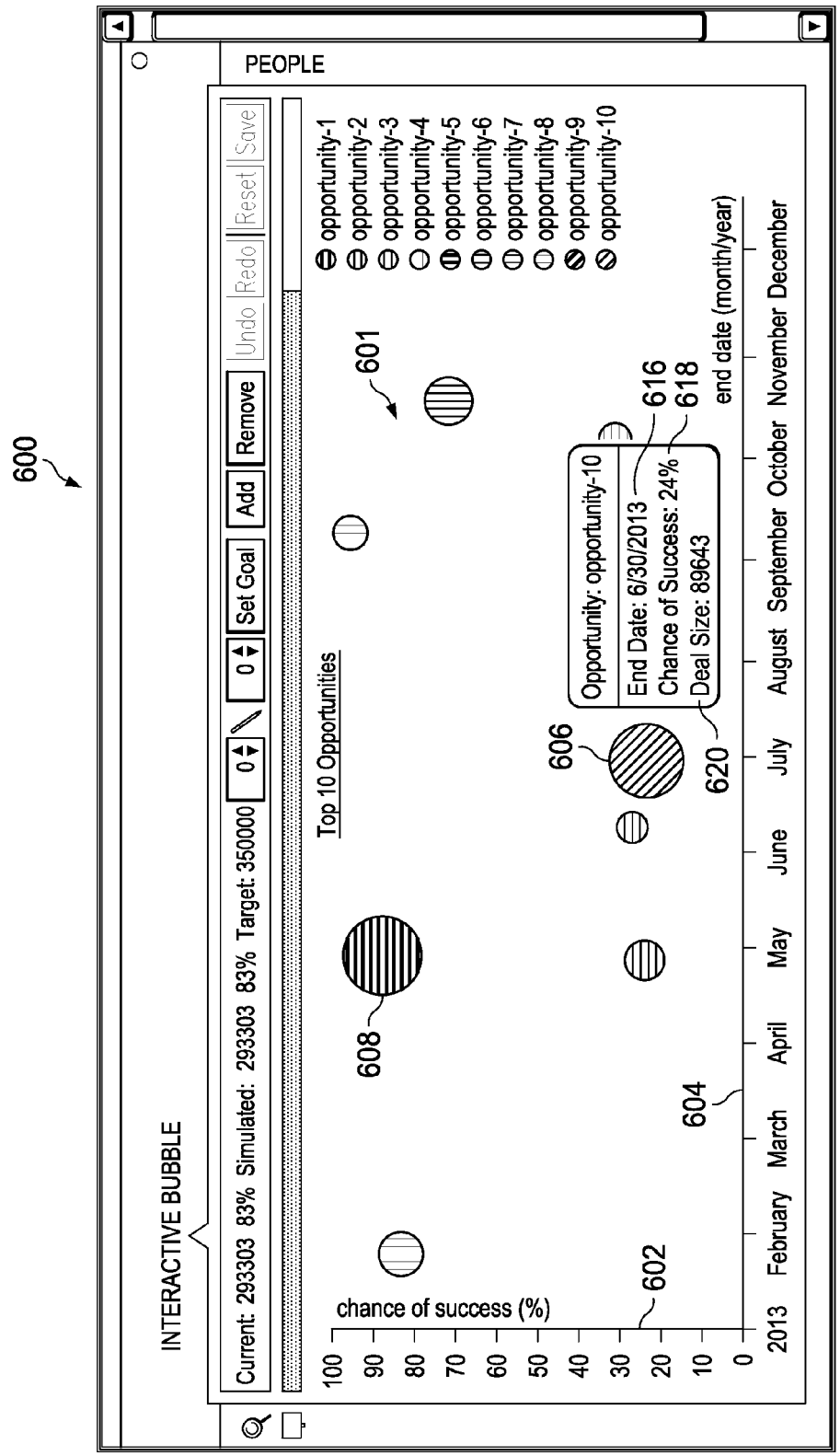

Turning briefly to FIG. 6B, another opportunity 606 includes a deal size 620 that is defined by its relative size (e.g., circumference) and an end date 616 that is defined by its x-axis location on the graph 601. The opportunity 606 also includes a chance of success 618 that is defined by its y-axis location on the graph 601. In some aspects, one or more of the deal size 620, end date 616, and chance of success 618 may represent a particular adjustable variable (e.g., user adjusted) of the opportunity 606, which in turn may represent a particular graphical analytic data module.

Figure 6C:
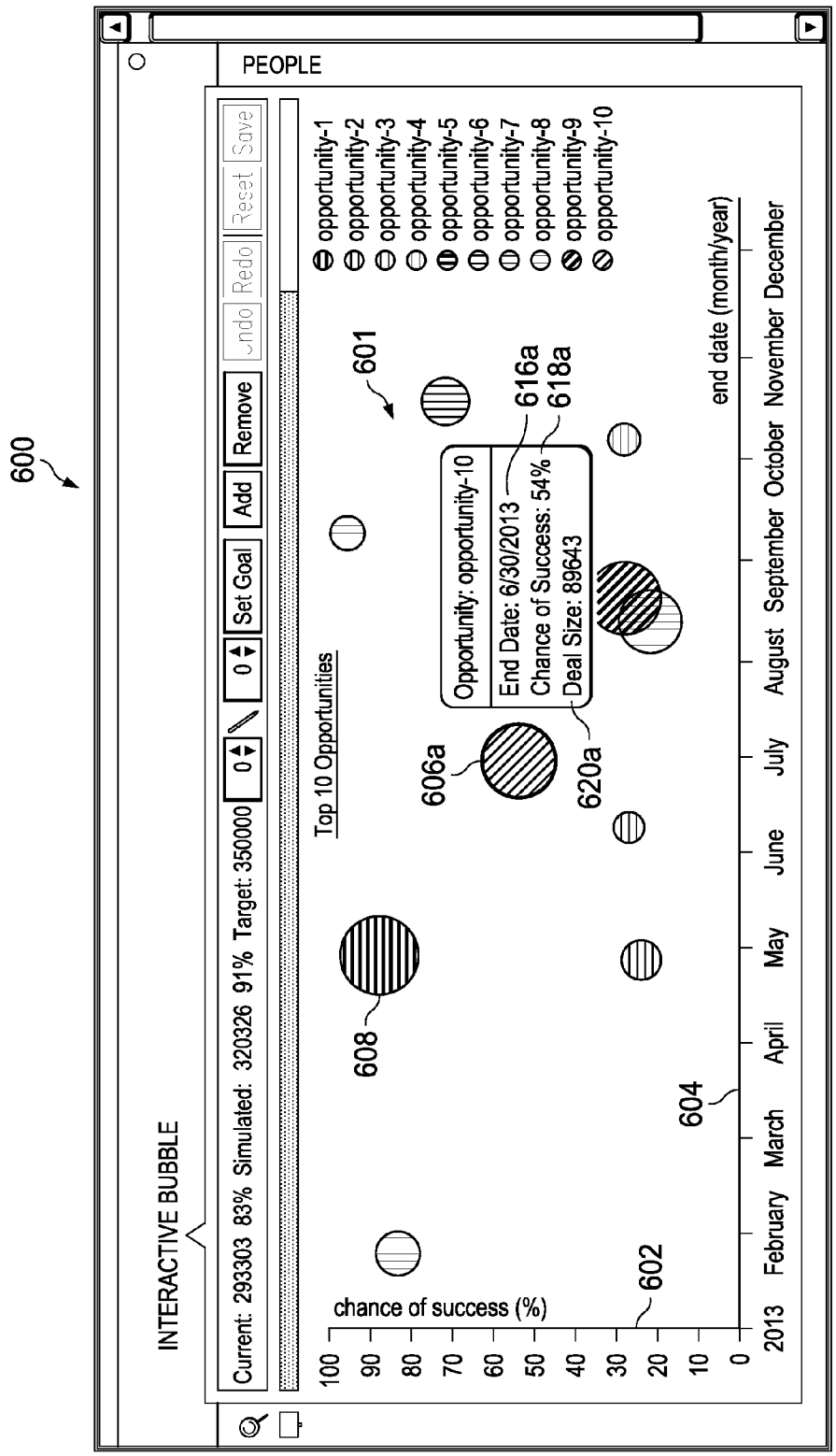
Figure 6D:
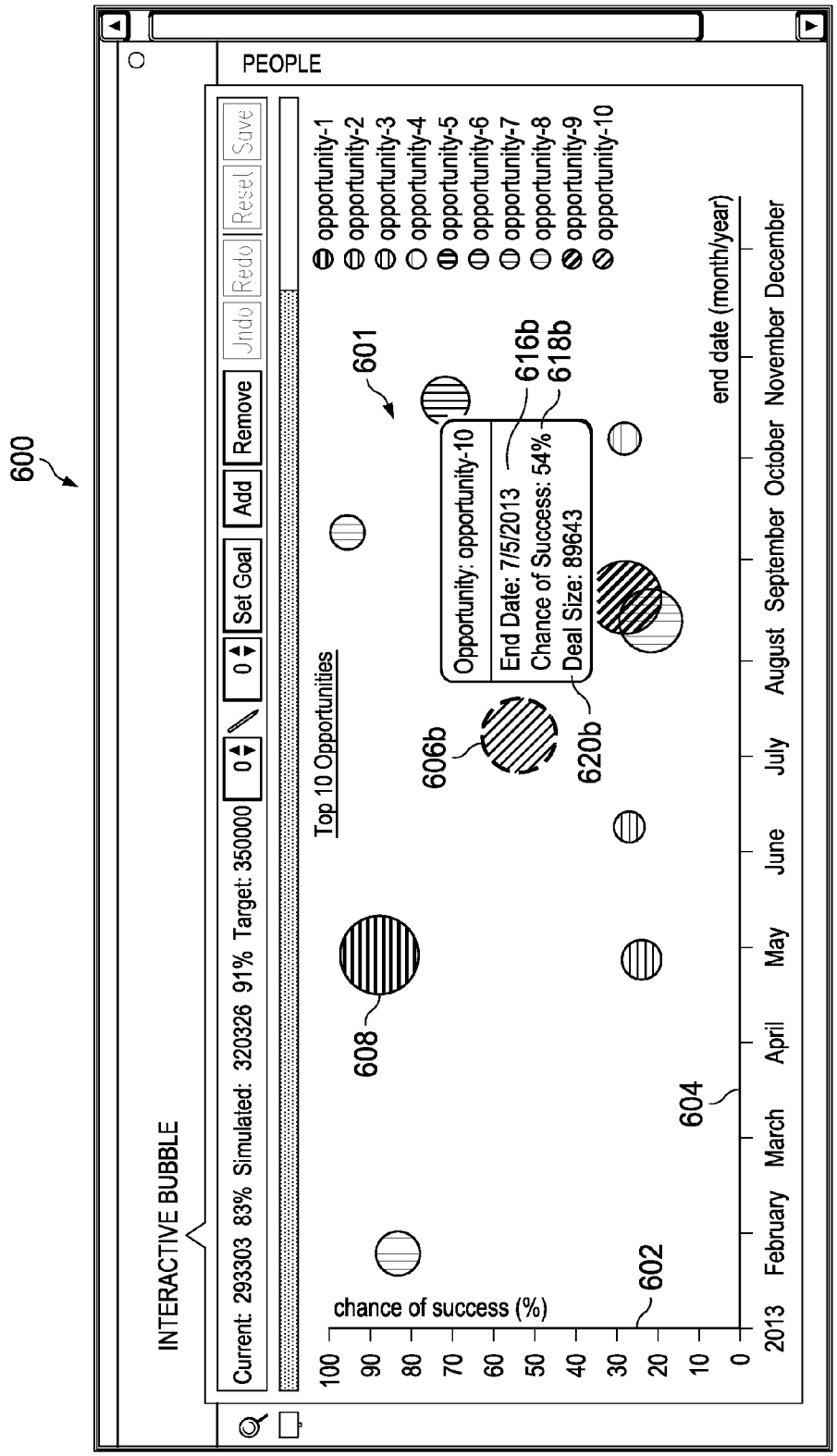
Figure 6E:
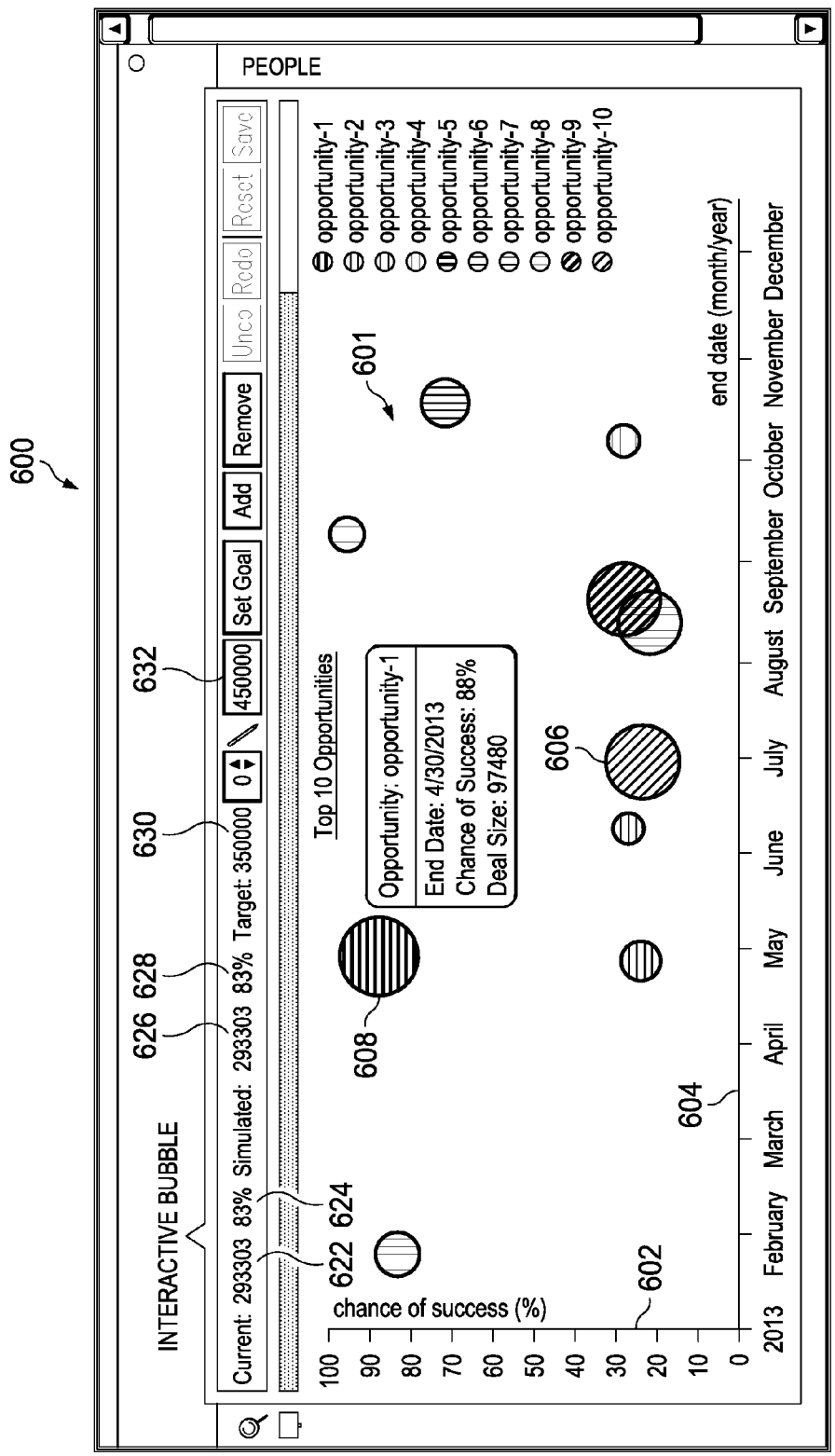

Turning briefly to FIG. 6E, a toolbar of the graph 601 is labeled with several data instances, each of which is also shown in FIGS. 6A-6D. As illustrated, the example toolbar includes a current value 622 of all of the opportunities shown on the graph 601; a percent of current value to target value 624 of all of the opportunities; a simulated value 626 of all of the opportunities shown on the graph 601; a percent of simulated value to target value 628 of all of the opportunities; a target value 630 of all of the opportunities on the graph 601, and a goal entry field 632 of the value of the opportunities on the graph 601. In some aspects, the current value 622 may represent the original (or actual) value of all of the opportunities before a simulation analysis, while the simulated value 626 may represent a calculated value of all of the opportunities, as a result of simulation analysis.

In step 504, a change to a particular variable of a particular graphical analytic data module is identified. In some aspects, the change can be initiated by the user on the graph 601, for example, through a UI adjustment of a particular variable of one of the opportunities shown in graph 601. For example, turning to FIG. 6C, a user initiated adjustment is illustrated in that opportunity 606 has been adjusted. FIG. 6C shows the adjusted opportunity 606a, which includes a deal size 620a that, in this example, matches deal size 620 (e.g., is unchanged), an end date 616a that, in this example, matches end date 616 (e.g., is unchanged), and a chance of success 618a that has been adjusted to 54% from the chance of success 618 of 24% shown in FIG. 6B. In this example, therefore, the user-initiated UI adjustment (e.g., through UI techniques such as drag and drop, drag and release, resize, and other techniques) is of the chance of success variable. In other examples, the end date variable and/or deal size variable may be adjusted through a user-initiated UI action (e.g., through UI techniques such as drag and drop, drag and release, resize, and other techniques).

As another example, with reference to FIG. 6D, two or more variables of a particular opportunity may be adjusted simultaneously or substantially simultaneously (or serially in some aspects). For example, as shown in FIG. 6D, both of the chance of success and end date variables of the opportunity 606 may be adjusted to yield the adjusted opportunity 606b. The adjusted opportunity 606b includes a deal size 620b that, in this example, matches deal size 620 and 620a (e.g., is unchanged), an end date 616b that, in this example, is adjusted to Jul. 5, 2013 from end date 616 and 616a, and a chance of success 618b that has been adjusted to 54% from the chance of success 618 of 24% shown in FIG. 6B. In this example, therefore, the user-initiated UI adjustment (e.g., through UI techniques such as drag and drop, drag and release, resize, and other techniques) is of two variables. In other example, additional variables (e.g., deal size) may be adjusted simultaneously or serially.

In step 506, one or more business attributes of the simulation analysis are adjusted based on the change to the particular variable of a particular graphical analytic data module. For instance, as illustrated in FIG. 6C, adjustment of a particular variable (in this example, adjusting chance of success 618 to chance of success 618a by moving the opportunity 606 upward on the graph 601) may propagate (e.g., automatically) other changes to business variables (e.g., output values) shown in graph 601. For example, as shown in FIG. 6C, the simulated value 626 and simulated percent of simulated value to goal value 628 are adjusted (e.g., relative to the values shown in FIG. 6B) based on the adjustment to the chance of success 618 of opportunity 606. As described above, adjustment of the other variables (e.g., output variables) may be performed by recalculating the particular variables based on one or more formulas entered by the user for the particular simulation analysis (e.g., through a formula editor or other input module).

In step 508, a revised virtual workspace may be presented to the user. The revised workspace (e.g., the graph 601 as shown in FIG. 6B-6D) may include any adjusted graphical analytic data modules as well as unadjusted graphical analytic data modules (e.g., opportunities 1-10 shown in graph 601). The revised virtual workspace may also include the adjusted one or more business attributes in step 506.

In step 510, a second change to a second variable of a particular graphical analytic data module is identified. As an example, with reference to FIG. 6D, two or more variables of a particular opportunity may be adjusted simultaneously or substantially simultaneously (or serially in some aspects). For example, as shown in FIG. 6D, both of the chance of success and end date variables of the opportunity 606 may be adjusted to yield the adjusted opportunity 606b. The adjusted opportunity 606b includes a deal size 620b that, in this example, matches deal size 620 and 620a (e.g., is unchanged), an end date 616b that, in this example, is adjusted from end date 616 and 616a, and a chance of success 618b that has been adjusted to 54% from the chance of success 618 of 24% shown in FIG. 6B. In this example, therefore, the user-initiated UI adjustment (e.g., through UI techniques such as drag and drop, drag and release, resize, and other techniques) is of two variables. In other example, additional variables (e.g., deal size) may be adjusted simultaneously or serially.

In some implementations, other user-initiated UI adjustments may be performed. For example, a user may adjust one or more of the current value 622 of all of the opportunities shown on the graph 601; the chance of success 624 of all of the opportunities; the simulated value 626 of all of the opportunities shown on the graph 601; the simulated chance of success 628 of all of the opportunities; the target value 630 of all of the opportunities on the graph 601, or the goal 632 of the value of the opportunities on the graph 601. By adjusting one or more of such business attributes of the simulation analysis, one or more variables (e.g., deal size, chance of success, end date) of one or more opportunities shown in graph 601 may be adjusted (e.g., automatically) according to, for example, one or more business formulas of the simulation analysis provided by the user. As one example, by adjusting the goal 632, a dimension (e.g., circumference) of one or more of the opportunities defined by the bubbles (e.g., 606 and 608) may be adjusted (e.g., made larger or smaller) to reflect the change in goal 632. This can be done, as illustrated, by the user filling in the data entry value of the goal 632. As another example, instead of a fill in box for the goal 632, a separate bubble, or other GUI components, such as a numeric slider, that represents the goal size of all of the opportunities may be placed in the graph 601. User-initiated adjustment of the bubble, or other similar GUI components for the goal (e.g., resize a dimension of the bubble) may also initiate a change to a dimension (e.g., circumference) of one or more of the opportunities defined by the bubbles (e.g., 606 and 608).

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIG. 5), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method of managing interactive analytic data, comprising:
    presenting a virtual workspace to a user, the virtual workspace comprising a visual representation of a simulation analysis that comprises a plurality of graphical analytic data modules, each graphical analytic data module comprising a plurality of variables that define a business process, the simulation analysis comprising a what-if analysis and the business process comprising an opportunity pipeline simulation;
    identifying a change, initiated by the user, to a particular variable of a particular graphical analytic data module of the plurality of graphical analytic data modules, the particular graphical analytical data module comprising a bubble that defines a business opportunity, the particular variable comprising a success percentage of the business opportunity and another of the plurality of variables comprising an end date of the business opportunity, the change defined by a user interface (UI) adjustment of a dimension of the particular graphical analytic data module that represents the particular variable, the change comprising a change to a circumference of the bubble;
    based on the identified change to the particular variable of the particular graphical analytic data module, adjusting at least one business process output of the simulation analysis; and
    presenting a revised virtual workspace to the user, the revised virtual workspace comprising the particular graphical analytic data module and at least one business process output of the simulation analysis.

2. The computer-implemented method of claim 1, wherein the change comprises a first change, the particular variable comprises a first particular variable, the dimension comprises a first dimension, and the UI adjustment comprises a first UI adjustment, the method further comprising:
    identifying a second change, initiated by the user, to a second particular variable of the particular graphical analytic data module, the second change defined by a second UI adjustment of a second dimension of the particular graphical analytic data module that represents the second particular variable.

3. The computer-implemented method of claim 2, wherein the first and second UI adjustments occur substantially simultaneously.

4. The computer-implemented method of claim 1, further comprising:
    identifying another change, initiated by the user, to another particular variable of the particular graphical analytic data module, the other change defined by another UI adjustment of another dimension of the particular graphical analytic data module that represents the particular variable, the other UI adjustment comprising a change to one or more coordinates of the particular graphical analytic data module in the virtual workspace.

5. The computer-implemented method of claim 1, wherein the UI adjustment comprises at least one of a drag and release action, a drag and drop action, or a resize action.

6. A computer storage medium encoded with a computer program, the program comprising instructions that when executed by one or more computers cause the one or more computers to perform operations comprising:
    presenting a virtual workspace to a user, the virtual workspace comprising a visual representation of a simulation analysis that comprises a plurality of graphical analytic data modules, each graphical analytic data module comprising a plurality of variables that define a business process, the simulation analysis comprising a what-if analysis and the business process comprising an opportunity pipeline simulation;
    identifying a change, initiated by the user, to a particular variable of a particular graphical analytic data module of the plurality of graphical analytic data modules, the particular graphical analytical data module comprising a bubble that defines a business opportunity, the particular variable comprising a success percentage of the business opportunity and another of the plurality of variables comprising an end date of the business opportunity, the change defined by a user interface (UI) adjustment of a dimension of the particular graphical analytic data module that represents the particular variable, the change comprising a change to a circumference of the bubble;
    based on the identified change to the particular variable of the particular graphical analytic data module, adjusting at least one business process output of the simulation analysis; and
    presenting a revised virtual workspace to the user, the revised virtual workspace comprising the particular graphical analytic data module and at least one business process output of the simulation analysis.

7. The computer storage medium of claim 6, wherein the change comprises a first change, the particular variable comprises a first particular variable, the dimension comprises a first dimension, and the UI adjustment comprises a first UI adjustment, and the operations further comprise:
    identifying a second change, initiated by the user, to a second particular variable of the particular graphical analytic data module, the second change defined by a second UI adjustment of a second dimension of the particular graphical analytic data module that represents the second particular variable.

8. The computer storage medium of claim 7, wherein the first and second UI adjustments occur substantially simultaneously.

9. The computer storage medium of claim 7, wherein the operations further comprise:
    identifying another change, initiated by the user, to another particular variable of the particular graphical analytic data module, the other change defined by another UI adjustment of another dimension of the particular graphical analytic data module that represents the particular variable, the other UI adjustment comprising a change to one or more coordinates of the particular graphical analytic data module in the virtual workspace.

10. The computer storage medium of claim 6, wherein the UI adjustment comprises at least one of a drag and release action, a drag and drop action, or a resize action.

11. A system of one or more computers configured to perform operations comprising:
   presenting a virtual workspace to a user, the virtual workspace comprising a visual representation of a simulation analysis that comprises a plurality of graphical analytic data modules, each graphical analytic data module comprising a plurality of variables that define a business process, the simulation analysis comprising a what-if analysis and the business process comprising an opportunity pipeline simulation;
   identifying a change, initiated by the user, to a particular variable of a particular graphical analytic data module of the plurality of graphical analytic data modules, the particular graphical analytical data module comprising a bubble that defines a business opportunity, the particular variable comprising a success percentage of the business opportunity and another of the plurality of variables comprising an end date of the business opportunity, the change defined by a user interface (UI) adjustment of a dimension of the particular graphical analytic data module that represents the particular variable, the change comprising a change to a circumference of the bubble;
   based on the identified change to the particular variable of the particular graphical analytic data module, adjusting at least one business process output of the simulation analysis; and
   presenting a revised virtual workspace to the user, the revised virtual workspace comprising the particular graphical analytic data module and at least one business process output of the simulation analysis.

12. The system of claim 11, wherein the change comprises a first change, the particular variable comprises a first particular variable, the dimension comprises a first dimension, and the UI adjustment comprises a first UI adjustment, and the operations further comprise:
   identifying a second change, initiated by the user, to a second particular variable of the particular graphical analytic data module, the second change defined by a second UI adjustment of a second dimension of the particular graphical analytic data module that represents the second particular variable.

13. The system of claim 12, wherein the first and second UI adjustments occur substantially simultaneously.

14. The system of claim 11, wherein the operations further comprise:
   identifying another change, initiated by the user, to another particular variable of the particular graphical analytic data module, the other change defined by another UI adjustment of another dimension of the particular graphical analytic data module that represents the particular variable, the other UI adjustment comprising a change to one or more coordinates of the particular graphical analytic data module in the virtual workspace.

15. The system of claim 11, wherein the UI adjustment comprises at least one of a drag and release action, a drag and drop action, or a resize action.

* * * * *